United States Patent [19]

Mowrey

[11] Patent Number: 5,281,638

[45] Date of Patent: Jan. 25, 1994

[54] AQUEOUS ADHESIVES BASED ON CHLOROSULFONATED POLYETHYLENE

[75] Inventor: Douglas H. Mowrey, Pleasantville, Pa.

[73] Assignee: Lord Corporation, Erie, Pa.

[21] Appl. No.: 52,814

[22] Filed: Apr. 23, 1993

Related U.S. Application Data

[63] Continuation-in-part of Ser. No. 805,396, Dec. 10, 1991, abandoned.

[51] Int. Cl.$^5$ .................. C09J 11/04; C09J 123/28
[52] U.S. Cl. .................. 524/105; 524/259; 524/260; 524/516; 524/576
[58] Field of Search .............. 524/104, 105, 259, 260, 524/516, 570, 576

[56] References Cited

U.S. PATENT DOCUMENTS

| | | | |
|---|---|---|---|
| 3,282,883 | 11/1966 | DeCrease et al. | 260/41 |
| 4,119,587 | 10/1978 | Jazenski et al. | 260/3.5 |
| 4,988,753 | 1/1991 | Rullmann et al. | 524/260 |
| 5,028,654 | 7/1991 | Wuest et al. | 524/259 |
| 5,036,122 | 7/1991 | Auerbach et al. | 524/259 |

FOREIGN PATENT DOCUMENTS 2155488  9/1985  United Kingdom ..

Primary Examiner—Joseph L. Schofer
Assistant Examiner—R. H. Delmendo
Attorney, Agent, or Firm—W. Graham Buie

[57] ABSTRACT

An aqueous adhesive composition containing a chlorosulfonated polyethylene latex, a polymaleimide compound, a nitroso compound and a metal oxide. The adhesive composition can be effectively utilized without a primer component and exhibits an unusually high resistance to pre-bake conditions and adverse environments. The adhesive also possesses the ability to effectively bond a variety of substrates.

7 Claims, No Drawings

AQUEOUS ADHESIVES BASED ON CHLOROSULFONATED POLYETHYLENE

This is a continuation-in-part of copending application Ser. No. 07/805,396 filed on Dec. 10, 1991, now abandoned.

FIELD OF THE INVENTION

The present invention relates to the bonding of various substrates to surfaces such as ferrous and non-ferrous metal surfaces. More specifically, the present invention relates to a one-component, aqueous adhesive composition based on a chlorosulfonated polyethylene latex and a polymaleimide compound.

BACKGROUND OF THE INVENTION

In an effort to keep pace with increasingly demanding bonding conditions and to comply with the numerous circumscribing environmental regulations, much of the research in the adhesive field is currently being directed towards developing a robust adhesive that can be applied as an aqueous formulation so as to avoid the use of volatile solvents. The fruits of these research efforts can be seen in recently issued U.S. Pat. Nos. 4,988,753 and 5,036,122. U.S. Pat. No. 4,988,753 describes an aqueous dispersion for bonding natural and synthetic elastomers to metallic and non-metallic substrates under vulcanizing conditions. The adhesive composition contains a mixture of chlorosulfonated polyethylene and vinyl chloride/vinylidene chloride/acrylic acid copolymer, an organic polynitroso compound, and a coreactive compound selected from diallyl acrylamide and phenylene bis-maleic acid imide. The adhesive composition may optionally contain other additives such as metal oxides, lead salts, and peroxides.

U.S. Pat. No. 5,036,122 describes an aqueous adhesive composition containing a latex of a polymerized conjugated diene, a poly-C-nitroso compound, and a polymaleimide compound which is a polymer of a bismaleimide. The polymerized conjugated diene is preferably poly-2,3-dichlorobutadiene or poly-1,1,2-trichlorobutadiene. The adhesive may optionally contain additives such as carbon black, metallic oxides, and surfactants.

U.S. Pat. No. 4,119,587 describes an adhesive composition containing a halogen-containing polyolefin, an aromatic nitroso compound, and a lead salt. The composition may optionally contain a maleimide compound. The use of a volatile organic solvent is also disclosed.

Many previously developed adhesive compositions such as the composition disclosed in U.S. Pat. No. 4,119,587 described above require the use of an organic solvent and/or the use of a lead salt, both of which can be detrimental to the environment. Also, many previously developed aqueous adhesive compositions such as those disclosed above require the use of an additional adhesive component, such as a primer component, in order to attain acceptable adhesive performance levels. A primer component is particularly needed in rubber-to-metal applications involving exposure to adverse environmental conditions where the metal surface is susceptible to corrosion that can degrade the adhesive bond. Furthermore, many aqueous adhesive compositions can only be utilized to bond a narrow range or class of substrates.

Traditional adhesives utilized for bonding elastomeric materials to metal are also frequently susceptible to the high temperature conditions experienced in the molding devices utilized in the bonding process. The molding devices which position and support the adhesive-coated metal parts are typically preheated or prebaked before the molten elastomeric material is applied to the metal part. This prebake frequently interferes with the bonding ability of the adhesive composition applied to the metal surface.

A one-component aqueous adhesive composition is needed which utilizes environmentally safe components to provide a robust adhesive bond to numerous types of substrates.

SUMMARY OF THE INVENTION

The present invention is a one-component aqueous adhesive composition which can be applied in an environmentally safe manner to provide a robust adhesive bond to a variety of substrates. The adhesive composition of the present invention comprises a latex of chlorosulfonated polyethylene, a polymaleimide compound, a nitroso compound, and a metal oxide. It has been discovered that this unique combination of ingredients results in an adhesive composition that can be utilized without the need for an additional adhesive component such as a primer component. The adhesive exhibits an unusually high resistance to prebake conditions and adverse environments and has the ability to effectively bond a variety of substrates.

DETAILED DESCRIPTION OF THE INVENTION

The chlorosulfonated polyethylene of the latex of the present invention is commercially available and can be prepared according to methods well known in the art, such as by dissolving polyethylene in carbon tetrachloride and subjecting the resulting solution to a mixture of chlorine gas and sulfur dioxide gas under high temperature and high pressure. The carbon tetrachloride is then removed to produce a powder of chlorosulfonated polyethylene. The latex of chlorosulfonated polyethylene of the present invention is also commercially available and can be prepared according to methods known in the art such as by dissolving the chlorosulfonated polyethylene in a solvent and adding a surfactant to the resulting solution. Water is then added to the solution under high shear to emulsify the polymer. The solvent is then stripped to obtain a latex having a total solids content of from about 10 to 60, preferably 25 to 50, percent by weight.

The chlorosulfonated polyethylene of the latex of the present invention typically has a molecular weight in the range of about 50,000 to 150,000, preferably about 60,000 to 120,000. The chlorine content of the chlorosulfonated polyethylene is typically is in the range of about 20 to 50, preferably about 25 to 45, percent while the sulfur content is typically in the range of about 0.5 to 2, preferably about 1.0 to 1.5 percent.

The chlorosulfonated polyethylene latex is typically utilized in an amount ranging from about 10 to 50, preferably about 25 to 35, percent by weight of the essential components of the present invention. "Essential components" herein refers to the chlorosulfonated polyethylene latex, the polymaleimide compound, the nitroso compound, and the metal oxide.

The polymaleimide compound of the invention may be an aliphatic or aromatic polymaleimide and must contain at least two maleimide groups. Aromatic polymaleimides having from about 2 to 100 aromatic nuclei wherein no more than one maleimide group is directly attached to each adjacent aromatic ring are preferred. Particularly preferred aromatic polymaleimide compounds have the formula:

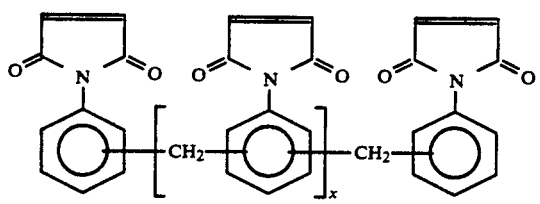

wherein x is from about 0 to 100. Such polymaleimides are common materials of commerce and are sold under different trade names by different companies, such as BMI-M-20 and BMI-S polymaleimides supplied by Mitsui Toatsu Fine Chemicals, Incorporated.

The polymaleimide compound is typically utilized in the present invention in an amount ranging from about 2 to 50, preferably about 5 to 15, percent by weight of the essential components.

The nitroso compound of the present invention can be any aromatic hydrocarbon, such as benzenes, naphthalenes, anthracenes, biphenyls, and the like, containing at least two nitroso groups attached directly to non-adjacent ring carbon atoms. More particularly, such nitroso compounds are described as aromatic compounds having from 1 to 3 aromatic nuclei, including fused aromatic nuclei, having from 2 to 6 nitroso groups attached directly to non-adjacent nuclear carbon atoms. The present preferred nitroso compounds are the dinitroso aromatic compounds, especially the dinitrosobenzenes and dinitrosonaphthalenes, such as the meta- or para-dinitrosobenzenes and the meta- or para-dinitrosonaphthalenes. The nuclear hydrogen atoms of the aromatic nucleus can be replaced by alkyl, alkoxy, cycloalkyl, aryl, aralkyl, alkaryl, arylamine, arylnitroso, amino, halogen, and like groups. The presence of such substituents on the aromatic nuclei has little effect on the activity of the nitroso compounds in the present invention. As far as is presently known, there is no limitation as to the character of the substituent, and such substituents can be organic or inorganic in nature. Thus, where reference is made herein to nitroso compound, it will be understood to include both substituted and unsubstituted nitroso compounds, unless otherwise specified.

Particularly preferred nitroso compounds are characterized by the formula:

(R)$_m$—Ar—(NO)$_2$ wherein Ar is selected from the group consisting of phenylene and naphthalene; R is a monovalent organic radical selected from the group consisting of alkyl, cycloalkyl, aryl, aralkyl, alkaryl, arylamine, and alkoxy radicals having from 1 to 20 carbon atoms, amino, or halogen, and is preferably an alkyl group having from 1 to 8 carbon atoms; and m is zero, 1, 2, 3, and 4, and preferably is zero.

A partial non-limiting listing of nitroso compounds which are suitable for use in the practice of the invention include m-dinitrosobenzene, p-dinitrosobenzene, m-dinitrosonaphthalene, p-dinitrosonaphthalene, 2,5-dinitroso-p-cymene, 2-methyl-1,4-dinitrosobenzene, 2-methyl-5-chloro-1,4-dinitrosobenzene, 2-fluoro-1,4-dinitrosobenzene, 2-methoxy-1-3-dinitrosobenzene, 5-chloro-1,3-dinitrosobenzene, 2-benzyl-1,4-dinitrosobenzene, 2-cyclohexyl-1,4-dinitrosobenzene and combinations thereof. Particularly preferred nitroso compounds include p-dinitrosobenzene and m-dinitrosobenzene. The nitroso compound is typically utilized in an amount ranging from about 10 to 60, preferably about 30 to 40, percent by weight of the essential components.

The metal oxide of the present invention can be any known metal oxide such as the oxides of zinc, cadmium, magnesium, lead, iron and zirconium; litharge; red lead; zirconium salts; and combinations thereof, with zinc oxide being the preferred metal oxide due to its unusual compatibility with and effectiveness in the present adhesive compositions. The metal oxide is typically utilized in an amount ranging from about 5 to 60, preferably about 15 to 25, percent by weight of the essential components.

Water, preferably deionized water, is utilized in combination with the essential components of the present invention in order to provide an adhesive composition having a final solids content of between about 10 and 70 percent, preferably about 30 and 50 percent.

The adhesive compositions of the present invention can optionally contain other well-known additives including plasticizers, fillers, pigments, dispersing and wetting agents, reinforcing agents and the like, in amounts employed by those skilled in the adhesive arts to obtain the desired color and consistency.

The adhesive compositions of the present invention may be prepared by any method known in the art, but are preferably prepared by combining and milling or shaking the ingredients and water in a ball-mill, sand-mill, ceramic bead-mill, steel bead-mill, high speed media-mill, or the like.

The adhesive composition of the invention is preferably utilized to bond an elastomeric material to a metal surface. The composition may be applied to the metal surface by spraying, dipping, brushing, wiping or the like, after which the adhesive is permitted to dry. The coated metal surface and elastomeric substrate are then brought together under heat and pressure to complete the bonding procedure. The surface of the metal and the elastomeric substrate are typically brought together under a pressure of from about 20.7 to 172.4 Mega Pascals (MPa), preferably from about 20 MPa to 50 MPa. The resulting rubber-metal assembly is simultaneously heated to a temperature of from about 140° C. to about 200° C., preferably from about 150° C. to 170° C. The assembly should remain under the applied pressure and temperature for a period of from about 3 minutes to 60 minutes, depending on the cure rate and thickness of the rubber substrate. This process may be carried out by applying the rubber substrate as a semi-molten material to the metal surface as in, for example, an injection-molding process. The process may also be carried out by utilizing compression molding, transfer molding or autoclave curing techniques. After the process is complete, the bond is fully vulcanized and ready for use in a final application.

Although preferred for use in bonding an elastomeric material to a metal surface, the present adhesive compositions may be applied as an adhesive, primer or coating to any surface or substrate capable of receiving the adhesive. The material, which may be bonded to a surface such as a metal surface in accordance with the present invention, is preferably a polymeric material, including any elastomeric material selected from any of the natural rubbers and olefinic synthetic rubbers including polychloroprene, polybutadiene, neoprene, Buna-S, Buna-N, butyl rubber, brominated butyl rubber, nitrile rubber, and the like. The material may also be a thermoplastic elastomer such as the thermoplastic elastomers sold under the tradenames SANTOPRENE and ALCRYN by Monsanto and DuPont, respectively. The surface to which the material is bonded can be any surface capable of receiving the adhesive such as a glass, plastic, or fabric surface, and is preferably a metal surface selected from any of the common structural metals such as iron, steel (including stainless steel), lead, aluminum, copper, brass, bronze, Monel metal, nickel, zinc, and the like. To bond the various substrates described above, the present adhesive may be applied to one or both of the surfaces or substrates to be bonded, after which the substrates are contacted under conditions sufficient to create an adhesive bond.

The following examples are provided for the purpose of illustration only and are not intended to limit the scope of the present invention which is defined by the claims.

EXAMPLE 1

An adhesive composition is prepared by combining the following ingredients (except the chlorosulfonated polyethylene latex) in an amount of deionized water sufficient to create a final total solids content (based on all ingredients) of 45 percent. These ingredients and water are then milled in a ceramic bead-mill for 30 minutes. To the resulting millbase is then slowly added the chlorosulfonated polyethylene latex which is stirred into the millbase by low-speed agitation.

| Ingredients | No. of Grams |
|---|---|
| Chlorosulfonated polyethylene latex[a] | 30 |
| Polybismaleimide[b] | 8 |
| Dinitrosobenzene | 35 |
| Zinc Oxide | 20 |
| Surfactant[c] | 1 |
| Dispersing Agent[d] | 1 |
| Carbon black[e] | 5 |

[a]HYPALON LATEX HYP-605 (Burke-Palmason Chemical Company)
[b]BMI-M-20 (Mitsui Toatsu Fine Chemicals, Incorporated)
[c]POLYWET Z1766 (Uniroyal, Inc.)
[d]MARASPERSE CBOS-4 (American Can Company)
[e]STERLING NS (Cabot Corporation)

The adhesive composition prepared above in Example 1 is coated onto grit-blasted steel coupons at a film thickness of 0.5 to 1.2 mils. The coated coupons are bonded to HC109 (40 durometer semi-EV cured natural rubber), HC106 (55 durometer semi-EV cured natural rubber), HC-202 (60–65 durometer Shore A styrene butadiene rubber), HC353 (60 durometer neoprene rubber), and HC100 (55 durometer conventionally cured natural rubber) elastomeric substrates by injection molding the rubber onto the coated coupons at 330° F., and then vulcanizing the rubber at 330° F. for approximately 10–15 minutes. The adhesive composition is also utilized to post vulcanization bond a HC100 substrate by assembling a cured HC100 rubber puck (1 inch in diameter and 72 inches in height) between two adhesive-coated metal surfaces under 10% compression and curing in a steam-heated autoclave for 30 minutes at 307° F. The bonded rubber-metal assemblies are then subjected to the tests described below.

PRIMARY ADHESION

Bonded parts are pulled to destruction according to ASTM Test D429-Method B. Parts are tested in peel with a peel angle of 45 degrees. The test is conducted at room temperature with a test speed of 20 inches per minute. After the bonded part fails, the peak peel strength value (measured in pounds) and the percent rubber retention on the adhesive coated area of the part are measured. The post vulcanization-bonded puck is tested according to ASTM Test D429-Method D.

72-HOUR SALT SPRAY

Bonded parts are buffed on the edges with a grinding wheel. The rubber is then tied back over the metal with stainless steel wire so as to stress the bonded area. This exposes the bondline to the environment. Failure is initiated by scoring the bondline with a razor blade. The parts are then strung on stainless steel wire and placed in a salt spray chamber. The environment inside the chamber is 100° F., 100 percent relative humidity, and 5 percent dissolved salt in the spray, which is dispersed throughout the chamber. The parts remain in this environment for 72 hours. Upon removal, the rubber is peeled from the metal with pliers. The percent rubber retention on the part is then measured.

2-Hour Boiling Water

Bonded parts are prepared the same way as they are for the salt spray test; however, in this test, the parts are placed in a beaker filled with boiling tap water. The parts remain in this environment for 2 hours. Upon removal, the rubber is peeled from the metal with pliers. The percent rubber retention on the part is then measured.

14-DAY ROOM TEMPERATURE WATER-IMMERSION

Bonded parts are prepared the same way as they are for the salt spray test. In this test, the parts are placed in a beaker filled with tap water which is at room temperature. The parts remain in this environment for 14 days. Upon removal, the rubber is peeled from the metal with pliers. The percent rubber retention on the part is then measured.

The results of the above tests are set forth in Table 1 below. In the data, reference is made to failure in the rubber body (R). Failure is expressed in terms of percent, and a high percent of failure in the rubber is desirable since this indicates that the adhesive bond is stronger than the rubber itself.

TABLE 1

| Test | Substrate | % Rubber Failure |
|---|---|---|
| Primary Adhesion | HC109 | 100R |
| Primary Adhesion | HC106 | 100R |
| Primary Adhesion | HC202 | 100R |
| Primary Adhesion | HC353 | 100R |
| 2 Hrs. Boiling Water | HC106 | 60R |
| 72-Hr. Salt Spray | HC106 | 83R |
| 72-Hr. Salt Spray | HC353 | 50R |
| 14-Day Rm. Temp. H$_2$O | HC100 | 90R |
| 14-Day Rm. Temp. H$_2$O | HC106 | 90R |
| Primary Adhesion (Post-vulcanization bonding) | HC100 | 75R |

EXAMPLE 2

An adhesive composition is prepared according to Example 1 utilizing the following amounts of ingredients:

| Ingredients | No. of Grams |
|---|---|
| Chlorosulfonated polyethylene latex[a] | 28 |
| Polybismaleimide[b] | 8 |
| Dinitrosobenzene | 37 |
| Zinc Oxide | 18 |
| Surfactant[c] | 1 |
| Dispersing Agent[d] | 1 |
| Carbon black[e] | 7 |

[a]HYPALON LATEX CSM-450 (Sumitomo Seika, Japan)
[b]BMI-M-20 (Mitsui Toatsu Fine Chemicals, Incorporated)
[c]POLYWET Z1766 (Uniroyal, Inc.)
[d]MARASPERSE CBOS-4 (American Can Company)
[e]STERLING NS (Cabot Corporation)

The adhesive composition prepared above is coated onto grit-blasted steel coupons at a dry film thickness of 0.5–1.2 mils. The coated coupons are bonded to HC508 (50–60 durometer butyl rubber) and HC109 elastomeric substrates by injection molding the elastomer onto the coated coupons at 330° F. and then vulcanizing the elastomer at 330° F. for 10 and 30 minutes for the HC109 and HC508 substrates, respectively. The bonded rubber-metal assemblies are then subjected to the test described below.

PRIMARY ADHESION

The parts are tested according to the primary adhesion test described above, except some of the parts are exposed to prebake or precure heat conditions. When prebaked, the parts are exposed to the molding temperature for a period of 5 minutes before the rubber is injected into the cavity. This simulates actual production conditions and helps determine if the adhesive remains active enough to successfully bond the rubber compound. The results of the test are set forth in Table 2 below.

TABLE 2

| Test | Substrate | Percent Rubber Failure | |
|---|---|---|---|
| | | 0′ Prebake | 5′ Prebake |
| Primary Adhesion | HC109 | 100R | 100R |
| Primary Adhesion | HC508 | 100R | 100R |

EXAMPLES 3–6

Adhesive compositions are prepared according to Example 1 utilizing the following amounts of ingredients:

| Ingredients | Ex. 3 | Ex. 4 | Ex. 5 | Ex. 6 |
|---|---|---|---|---|
| Chlorosulfonated polyethylene latex[a] | 24.99 | 30.62 | 30.62 | 30.62 |
| Polybismaleimide[b] | 7.76 | 21.51 | 16.21 | 28.92 |
| Dinitrosobenzene | 36.88 | 18.52 | 29.12 | 25.52 |
| Zinc Oxide | 19.41 | 21.51 | 16.21 | 7.10 |
| Surfactant[c] | 0.6 | 0.74 | 0.74 | 0.74 |
| Dispersing Agent[d] | 1.55 | 1.70 | 1.70 | 1.70 |
| Carbon black[e] | 8.73 | 5.40 | 5.40 | 5.40 |

[a]HYPALON LATEX HYP-605 (Burke-Palmason Chemical Company)
[b]BMI-M-20 (Mitsui Toatsu Fine Chemicals, Incorporated)
[c]POLYWET Z1766 (Uniroyal, Inc.)
[d]MARASPERSE CBOS-4 (American Can Company)
[e]RAVEN 14 (Columbian Chemicals Company)

The adhesive compositions of Examples 3–6 are coated onto grit-blasted steel coupons at a dry film thickness of 0.75–1.0 mils. The coated coupons are bonded to HC106 substrate by injection molding the elastomer onto the coated coupons at 307° F. and then vulcanizing the elastomer at 307° F. for 15 minutes. The bonded rubber-metal assemblies are then subjected to the tests described immediately below.

Primary Adhesion

This test is the same as the primary adhesion test described for Example 1.

24-HOUR SALT SPRAY

This test is the same as the 72-hour salt spray test above except the parts remain in the environment for 24 hours.

1-HOUR BOILING WATER

This test is the same as the 2-hour boiling water test above except the parts remain in the environment for 1 hour.

7-DAY ROOM TEMPERATURE WATER IMMERSION

This test is the same as the 14-day room temperature water immersion test above except the parts remain in the environment for 7 days.

The results of the tests are set forth below in Table 3.

TABLE 3

| Test | Example | % Rubber Failure |
|---|---|---|
| Primary Adhesion | 3 | 100 |
| Primary Adhesion | 4 | 99 |
| Primary Adhesion | 5 | 100 |
| Primary Adhesion | 6 | 89 |
| 1 Hr. Boiling Water | 3 | 80 |
| 1 Hr. Boiling Water | 4 | 78 |
| 1 Hr. Boiling Water | 5 | 22 |
| 1 Hr. Boiling Water | 6 | 52 |
| 24-Hr. Salt Spray | 3 | 95 |
| 24-Hr. Salt Spray | 4 | 67 |
| 24-Hr. Salt Spray | 5 | 66 |
| 24-Hr. Salt Spray | 6 | 76 |
| 7-Day Rm. Temp. $H_2O$ | 3 | 90 |
| 7-Day Rm. Temp. $H_2O$ | 4 | 90 |
| 7-Day Rm. Temp. $H_2O$ | 5 | 63 |
| 7-Day Rm. Temp. $H_2O$ | 6 | 50 |

EXAMPLES 7–9

Adhesive compositions are prepared according to Example 1 utilizing the weight percentages of the following ingredients:

| Ingredients | Ex. 7 | Ex. 8 | Ex. 9 |
|---|---|---|---|
| Chlorosulfonated polyethylene latex[a] | 27.0 | 27.0 | 27.0 |
| Polybismaleimide A[b] | — | 11.0 | 11.0 |
| Polybismaleimide B[c] | 11.0 | — | — |
| p-Dinitrosobenzene | 40.0 | 40.0 | — |
| 2-methyl-1,4-dinitrosobenzene | — | — | 40.0 |
| Zinc Oxide | 9.0 | — | 9.0 |
| Iron Oxide | — | 9.0 | — |
| Dispersing Agent[d] | 1.0 | 1.0 | 1.0 |
| Carbon black[e] | 12.0 | 12.0 | 12.0 |

[a]HYPALON LATEX HYP-605 (Burke-Palmason Chemical Company)
[b]BMI-M-20 (Mitsui Toatsu Fine Chemicals, Incorporated)
[c]BMI-S (Mitsui Toatsu Fine Chemical, Incorporated)
[d]MARASPERSE CBOS-4 (American Can Company)
[e]RAVEN 14 (Columbian Chemicals Company)

The adhesive compositions of Examples 7-9 are coated onto grit-blasted steel coupons at a dry film thickness of 0.75 to 1 mils. The coated coupons are bonded to HC-106 substrate by injection molding the elastomer onto the coated coupons at 307° F. and then vulcanizing the elastomer at 307° F. for 15 minutes. The bonded rubber-to-metal assemblies are then subjected to the primary adhesion test described above as well as the additional tests described below. The results for the tests are shown below in Table 4.

300° F. HOT TEAR

The bonded parts are heated to 300° F. and then subjected to the primary adhesion test described above.

120 HOUR, 265° F. HEAT AGE

The bonded parts are aged in an oven for 120 hours at 265° F. The parts are then allowed to cool to room temperature, after which they are subjected to the primary adhesion test described above.

TABLE 4

| | HC-106 Substrate | | |
|---|---|---|---|
| Example | Primary Adhesion | 300° F. Hot Tear | 120 Hour, 265° F. Heat Age |
| 7 | 100R | 100R | 100R |
| 8 | 100R | 100R | 100R |
| 9 | 100R | 100R | 100R |

Examples 7-9 demonstrate the utility of different polymaleimide compounds, different nitroso compounds, and different metal oxides for purposes of the present invention.

As can be seen from the above data, the adhesive compositions of the present invention can be utilized as a one-component adhesive system to provide excellent adhesion to a variety of substrates. The data indicates that the present adhesive compositions provide excellent resistance to prebake conditions and adverse environmental conditions.

What is claimed is:

1. An aqueous adhesive composition comprising a chlorosulfonated polyethylene latex; a polymaleimide compound; an aromatic nitroso compound selected from the group consisting of m-dinitrosobenzene, p-dinitrosobenzene, m-dinitrosonaphthalene, p-dinitrosonaphthalene, 2,5-dinitroso-p-cymene, 2-methyl-1,4-dinitrosobenzene, 2-methyl-5-chloro-1,4-dinitrosobenzene, 2-fluoro-1,4-dinitrosobenzene, 2-methoxy-1-3-dinitrosobenzene, 5-chloro-1,3-dinitrosobenzene, 2-benzyl-1,4-dinitrosobenzene, 2-cyclohexyl-1,4-dinitrosobenzene and combinations thereof; and a metal oxide selected from the group consisting of the oxides of zinc, cadmium, magnesium, lead, iron and zirconium; wherein the polymaleimide compound has the formula:

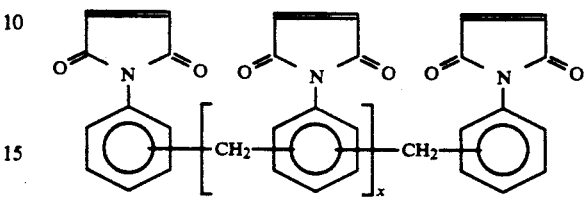

wherein x is from about 0 to 100.

2. An adhesive composition according to claim 1 wherein the chlorosulfonated polyethylene latex is present in an amount from about 10 to 50 percent by weight, the polymaleimide compound is present in an amount from about 2 to 50 percent by weight, the nitroso compound is present in an amount from about 10 to 60 percent by weight, and the metal oxide is present in an amount from about 5 to 60 percent by weight.

3. An adhesive composition according to claim 2 wherein the chlorosulfonated polyethylene latex is present in an amount from about 25 to 35 percent by weight, the polymaleimide compound is present in an amount from about 5 to 15 percent by weight, the nitroso compound is present in an amount from about 30 to 40 percent by weight, and the metal oxide is present in an amount from about 15 to 25 percent by weight.

4. The adhesive composition according to claim 1 wherein the latex has a chlorine content in the range of about 20 to 50 percent, and a sulfur content in the range of about 0.5 to 2.0 percent.

5. The adhesive composition according to claim 4 wherein the chlorine content is in the range of about 25 to 45 percent, and the sulfur content is in the range of about 1.0 to 1.5 percent.

6. The adhesive composition according to claim 1 wherein the nitroso compound is m-dinitrosobenzene or p-dinitrosobenzene.

7. The adhesive composition according to claim 1 wherein the metal oxide is zinc oxide.

* * * * *